United States Patent
Peale et al.

(10) Patent No.: US 6,633,693 B1
(45) Date of Patent: Oct. 14, 2003

(54) TEMPERATURE CONTROL OF MICRO-MIRRORS OF AN OPTICAL SWITCH SUBSTRATE

(75) Inventors: David R. Peale, Tinton Falls, NJ (US); Walter Framski, Prospect, CT (US); Lih Lin, Little Silver, NJ (US)

(73) Assignee: Tellium, Inc., Oceanport, NJ (US)

( * ) Notice: Subject to any disclaimer, the term of this patent is extended or adjusted under 35 U.S.C. 154(b) by 371 days.

(21) Appl. No.: 09/817,238

(22) Filed: Mar. 27, 2001

(51) Int. Cl.[7] .................................................. G02B 6/42
(52) U.S. Cl. ........................................................ 385/18
(58) Field of Search ............................... 385/18, 16, 17, 385/19, 20, 25, 31, 33, 93, 15, 40; 359/290, 627, 291, 618

(56) References Cited

U.S. PATENT DOCUMENTS

| | | | |
|---|---|---|---|
| 5,955,772 A | 9/1999 | Shakouri et al. | 257/467 |
| 6,330,102 B1 * | 12/2001 | Daneman et al. | 359/290 |
| 6,430,333 B1 * | 8/2002 | Little et al. | 385/18 |
| 6,522,802 B2 * | 2/2003 | Hoen | 385/18 |
| 6,545,425 B2 * | 4/2003 | Victor | 315/169.3 |
| 6,549,703 B1 * | 4/2003 | Tanielian et al. | 385/33 |
| 6,560,384 B1 * | 5/2003 | Helkey et al. | 385/18 |
| 2002/0047637 A1 * | 4/2002 | Victor | 315/294 |

* cited by examiner

*Primary Examiner*—Jean F. Duverne
(74) *Attorney, Agent, or Firm*—Jeffrey J. Brosemer

(57) ABSTRACT

A temperature control system is provided for an optical switch including steerable micro-mirrors. The system includes at least one sensor and associated sensing circuitry for measuring the temperature of a micro-mirror or a region of a substrate near a micro-mirror. The system also includes a controller that responds to a signal provided by the sensing circuitry. The controller response may include activating heating or cooling devices the region that is sensed to adjust the temperature of the region.

29 Claims, 13 Drawing Sheets

TEMPERATURE CONTROL OF MICRO-MIRRORS OF AN OPTICAL SWITCH SUBSTRATE

BACKGROUND OF THE INVENTION

1. Field of the Invention

The present invention relates to an optical switch having movable optical switching elements, and more particularly to monitoring and controlling temperature variations of micro-machined micro-mirrors in an optical switching device.

2. Description of the Related Art

Increasing demands for high-speed Internet service and wireless communications are soon expected to outstrip current telecommunications capacity. Because optical fiber networks are capable of transmitting huge volumes of data at blinding speeds, telecommunications carriers are turning to optical fiber networks in an effort to meet future needs.

In order to implement tomorrow's optical fiber networks, the telecommunications industry needs new optical devices that are inexpensive, efficient, and scalable to accommodate future optical telecommunications network expansion. Telecommunications providers prefer optical fiber networks that can be reconfigured quickly and efficiently. This gives the optical network the flexibility to accommodate growth and changes in future communications patterns. The ability to reconfigure quickly and efficiently also enables the network to restore failed communications by rerouting the communications to bypass the failure.

Optical fiber networks can be reconfigured at network nodes using optical switches to change the coupling between incoming optical fibers and outgoing optical fibers. Currently under development are optical switches that use movable micro-mirrors. These optical switches couple the optical signals between input and output fibers entirely in optical form, instead of converting the optical signals to electrical signals, switching the electrical signals, and converting the switched electrical signals back to optical signals.

To successfully operate such switches, the components—including fibers, lenses, and the micro-mirrors—must be properly aligned and the angular position of the movable micro-mirrors must be precisely controlled. If the angular position of the movable micro-mirrors is off and/or if the other components are not properly aligned, some or all of the light from the input fibers will not reach the selected output fiber. At switching speeds needed for optical communication, a micro-mirror based switch must accurately and reliably move a mirror into position on command and hold maximum input-to-output optical coupling its position over long time scales.

In an optical switch utilizing movable micro-mirrors, beams of light are switched by reflecting the light beams off surfaces of steerable micro-mirrors. For efficient and reliable switching, the mirror surfaces should be substantially free to target the reflected beams with minimal divergence and high precision. However, it has been found that the temperature of a structure supporting moveable micro-mirrors may adversely affect the geometry of the micro-mirrors. It also has been found that temperature gradients may be present across structures supporting moveable micro-mirrors in an optical switch. Temperature gradients cause differential micro-mirror shapes between regions at different temperatures and/or localized alteration of a micro-mirror shape. Depending on the temperature a micro-mirror acquires in either scenario, differences between the coefficients of thermal expansion of micro-mirror materials may cause a micro-mirror to curve into either a concave or convex shape.

Generally, the ambient temperature across a micro-mirror supporting structure may affect the radius of curvature of the its micro-mirrors. Changes in the radius of curvature of a micro-mirror may increase the optical loss of an optical switch by defocusing light beams reflecting off the mirror, and thus cause inefficient and/or inaccurate translation of a light beam in the switch from an input fiber to a selected output fiber.

As shown in FIG. 9a, a micro-mirror 22 operating within a stabilized temperature may have little or no curvature along axis 900. In some applications, micro-mirror 22 may have a predetermined curvature or operate with an acceptable level of curvature. Micro-mirror 22 may be formed of a semiconductor material 22-a, such as silicon, having a light reflecting coating 22-b formed on its upper surface. Because the upper surface of micro-mirror 22 has limited curvature, light rays 901 incident on the micro-mirror surface will be reflected with accuracy toward the intended target 902.

If material 22-a and coating 22-b have different coefficients of thermal expansion, one material forming the mirror, 22-a or 22-b, may expand to a greater extent than another material, 22-b or 22-a, and thus cause the mirror to curve or deform. FIG. 9b shows micro-mirror 22 operating at a temperature greater than the stabilized temperature. As illustrated in FIG. 9b, if a substantial curvature occurs in a micro-mirror 22, a portion of the incident rays 903 are directed away from the intended target 902. Thus, an increase in curvature may cause an increase in the number of rays failing to reach the intended target within the switch.

While the temperature of the overall switch package containing a mirror-supporting structure may be controlled effectively using known heat sinking methods, the mirror supporting structures within the package are subject to localized heating due to differences in local heat sink efficiency. For example, the entire mirror supporting structure temperature may rise or fall relative to other switch sections or portions. Temperature gradients across a surface of a mirror supporting structure also may arise from power dissipated in circuitry near, in, or on the mirror supporting structure, from optical power dissipated in more in some regions of the supporting structure than others, and/or from other conditions affecting the switch's ambient environment.

Hence, for accurate and reliable optical switching, mirror-supporting structures in movable micro-mirror switches should be insensitive to temperature variations that would otherwise affect a desired optical signal path. Thus, there remains a need in the art for optical fiber switching systems that are responsive to changes in ambient temperature that may otherwise cause inefficient and inaccurate translation of light beams from input fibers to selected output fibers.

SUMMARY OF THE INVENTION

The present invention has been made in view of the above circumstances and has as an object to provide an efficient and reliable optical switch.

One aspect of the present invention is an optical switch system that maintains a substantially uniform temperature across an element of an optical switch.

Another aspect of the present invention is an optical switch having a structure for monitoring a temperature variation across an element of the switch.

Yet another aspect of the present invention includes a structure and method for adjusting the temperature of portions of a movable mirror assembly.

Additional aspects and advantages of the invention will be set forth in part in the description that follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 3c provides a top view of the electrode arrangement included in the optical switch of FIG. 3a.

DESCRIPTION OF THE PREFERRED EMBODIMENTS

Reference will now be made in detail to the present exemplary embodiments of the invention illustrated in the accompanying drawings. Whenever possible, the same reference numbers will be used throughout the drawings to refer to the same or like parts.

The present invention is particularly useful for reliable and accurate control of steerable mirror elements used to switch optical signals in optical telecommunications network systems that carry optical communications signals, such as wavelength division multiplexed (WDM) signals, over optical fibers. In particular, the present invention includes switching system structures and methods that sense and respond to non-uniform temperature variations arising in optical switch elements that include movable micro-mirrors. A localized temperature variation may be sensed by placing temperature-sensing elements in regions of a micro-mirror supporting structure (mirror chip) to provide signals indicative of each region's localized temperature. Signals from the plurality regions may be compared to each other and/or to a reference value, to determine variances in temperature across the chip surface. The system response to one or more non-uniform spatial temperature distributions may include local heating of corresponding regions and/or locally cooling corresponding regions to bring the temperature distribution into a desired level of uniformity.

Alternatively or in combination with the foregoing, the present invention also may include switching system structures and-methods that sense the temperature of one or more optical switch elements supporting a plurality of micro-mirrors, compare the sensed temperature with a predetermined value or range of values, and respond to the sensed temperature by cooling and/or heating the optical switch elements when the sensed value is different from the predetermined value or is outside the predetermined range of values. For example, in addition to heating or cooling localized regions of the micro-mirror supporting structure to attain substantial uniformity of temperature across a surface of the supporting structure, a response to a sensed temperature of one or more temperature sensors placed on or integrated in the supporting structure also may include heating and/or cooling the structure to a temperature that lies within an desirable operating range.

Figure 1:
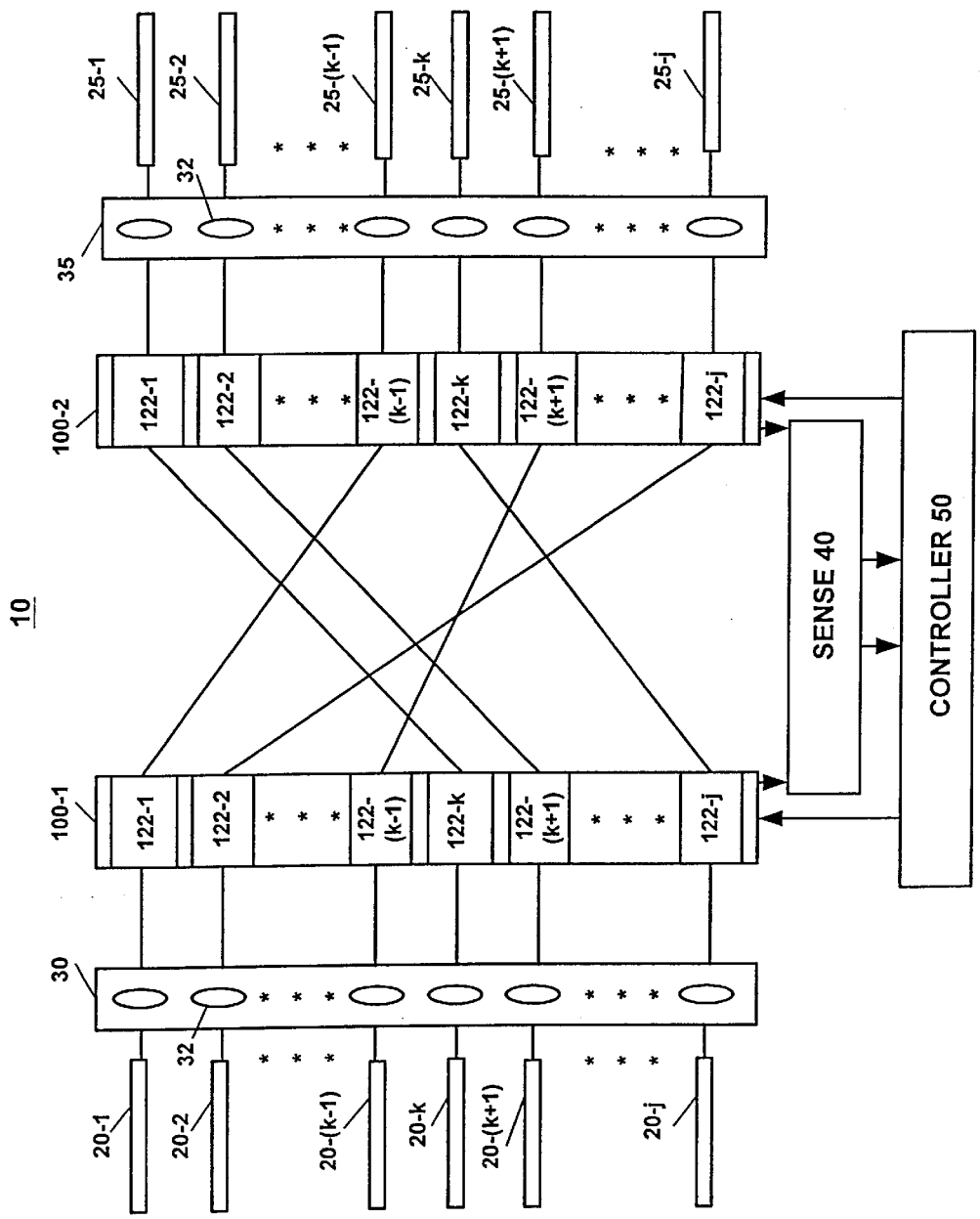
FIG. 1 provides a schematic of an illustrative optical switch design that includes micro-mirrors in accordance with the present invention.

The present invention provides a system and method for monitoring and controlling the temperature of a micro-mirror supporting structure that keeps the radius of curvature of the micro-mirrors under close control. FIG. 1 illustrates a schematic of an optical switch 10 according to the present invention. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The input optical fibers 20 and output optical fibers 25 may be arranged in any way, for example a k x j/k rectangular array, such as a square array. The present invention is not limited by the types of the optical signals carried by the input optical fibers 20 and output optical fibers 25. Each optical input fiber 20 may carry WDM signals, a single wavelength optical signal that was demultiplexed from a WDM signal by a wavelength division demultiplexer, or other types of optical signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 1 shows a schematic of an embodiment with j input optical fibers 20 and j output optical fibers 25, the number of input optical fibers may differ from the number of output optical fibers.

The input optical fibers 20 carry optical signals that are supplied, respectively, to a lens arrangement 30. The lens arrangement 30 may include a plurality of micro-lenses 32 arranged in an array. Alternatively, lenses 32 may be integrated with fibers 20. Micro-lenses 32 are preferably arranged so that each input optical fiber 20 is aligned with a micro-lens 32. In this way, optical signals emitted from an input fiber 20 will pass through one of the micro-lenses 32. Micro-lenses 32 direct optical beams from the input optical fibers 20 to a first arrangement of micro-mirrors 100-1, which will be described in greater detail below.

The first micro-mirror arrangement 100-1 includes a plurality of movable micro-mirrors 122. The micro-mirrors 122 may be arranged in an array, e.g., a rectangular or square array. Of course, other arrangements of the micro-mirrors 122 may be used as well. In a preferred embodiment, each input optical fiber 30 corresponds to one micro-lens 32 of the first lens arrangement 30 and one micro-mirror 122 of the first micro-mirror arrangement 100-1. Using the micro-mirrors 122 and responsive to control signals, the first micro-mirror arrangement 100-1 couples the optical beams from the lens array 30 to selected movable micro-mirrors 122 of a second arrangement of micro-mirrors 100-2. The second micro-mirror arrangement 100-2 includes micro-mirrors 122 that may be arranged in an array, e.g., a square or rectangular array or other arrangement. The second micro-mirror arrangement 100-2 need not match the first micro-mirror arrangement 100-1. While not shown in FIG. 1, one or more lenses or other optical devices may be interposed between the mirror arrangements 100-1, 100-2, such as described, for example, in U.S. application Ser. No. 09/769,481, filed Jan. 26, 2001, and hereby incorporated by reference.

Each micro-mirror 122 of the first arrangement 100-1 is preferably movable to permit an input beam to be reflected by the micro-mirror 122 to any micro-mirror 122 of the second arrangement 100-2. The micro-mirrors 122 of the second arrangement 100-2, also responsive to control signals, receive and couple the optical beams through a second lens array 35 to output fibers 25. The second lens arrangement 35 includes micro-lenses 32, which may be arranged in an array, aligned with output optical fibers 25. Micro-lenses 32 direct the optical beams into output optical fibers 25. Accordingly, optical signals carried on input optical fibers 20 may be selectively coupled to output optical fibers 25.

Micro-mirrors 122 of the second micro-mirror arrangement 100-2 are preferably movable to permit a light beam received from any of the micro-mirrors 122 of the first arrangement 100-1 to be directed through a micro-lens 32 of second lens arrangement 35 to an output optical fiber 25. In one embodiment, each micro-mirror 122 of the second arrangement 100-2 corresponds to one micro-lens 32 of the second lens arrangement 35 and one output optical fiber 25.

Micro-mirror arrangements 100-1 and 100-2 can be controlled to redirect or switch the coupling of optical signals. For example, as shown in FIG. 1, movable micro-mirror 122-1 of arrangement 100-1 directs an optical signal to movable micro-mirror 122-(k+1) of arrangement 100-2. However, responsive to control signals, movable micro-mirror 122-1 of arrangement 100-1 may redirect the optical signal it receives from input optical fiber 20-1 to movable micro-mirror 122-2 of arrangement 100-2. Micro-mirror 122-2 may be controlled to receive the optical signal and provide it to optical fiber 25-2.

While FIG. 1 shows a one stage switching arrangement, one or more additional stages of micro-mirror arrangements may be interposed between micro-mirror arrangements 100-1 and 100-2 to form a multi-stage switching arrangement.

The present invention uses sense circuitry 40, shown schematically in FIG. 1, to sense the temperature of micro-mirror arrangements 100-1 and 100-2. In accordance with the present invention, sense circuitry 40 includes circuitry for receiving a signal from one or more temperature sensors distributed in regions about mirror arrangements 100-1, 100-2. Optical switch 10 may also include other sensing circuitry, such as the capacitance and/or optical sensing circuitry in mirror feedback control systems disclosed in copending application Ser. No. 09/756,675, filed Jan. 10, 2001, the entire contents of which are hereby incorporated by reference.

Sense circuitry 40 may continually or periodically monitor the temperature of a micro-mirror or regions near one or more micro-mirrors within an optical switch 10. Sensing circuitry 40 generates a signal corresponding to a temperature sensed by one or more temperature sensors provided on mirror arrangements 100-1, 100-2. While sensing circuit 40 is shown schematically in FIG. 1, a single sensing circuit 40 may be provided for one or more temperature sensors. For example, several temperature sensors provided about mirror arrangements 100-1, 100-2 may share one sensing circuit on a continuous or a time-sharing basis. Alternatively, a plurality of sensing circuits may be provided on mirror arrangements 100-1, 100-2 to receive signals from a plurality of temperature sensors. For example, regions including a plurality of micro-mirrors may each include a sensing circuit 40 for sensing a temperature from one or more temperature sensors provided in each region. The plurality of micro-mirrors may form groups that include two or more mirrors, each having one or more temperature sensors placed near or on micro-mirrors of the group. Of course, each micro-mirror in mirror arrangements 100-1 and/or 100-2 may have its own associated temperature sensor that is paired with separate sensing circuitry 40. On the other hand, only one temperature sensor may be provided for each of the mirror arrangements 100. Alternatively or in combination with providing temperature sensors on or in proximity of micro-mirrors, one or more temperature sensors may be provided with circuitry provided on micro-mirror arrangements 100-1, 100-2.

Signals indicative of temperature generated by sensing circuitry 40 are received by a controller 50 that may adjust the temperature in a sensed region when a predetermined temperature value is reached and/or when variations exist between a plurality of sensed regions. Controller 50 may initiate a cooling process in one or more regions having a higher temperature than other regions to bring the temperature distribution on the surface of mirror arrangements 100-1, 100-2 to a desired level of uniformity. Alternatively, controller 50 may initiate a heating process of one or more temperature sensed regions of arrangements 100-1, 100-2 to achieve a desired temperature level.

Controller 50 may additionally receive control inputs and generate output control signals to control the position of the micro-mirrors 122 of the first and second micro-mirror arrangements 100-1 and 100-2. Controller 50 may also receive feedback signals that are based on sensed capacitive and/or optical power signals, such as described in copending application Ser. No. 09/756,675, filed Jan. 10, 2001, and incorporated by reference. The controller 50 may be, for example, a computer or application-specific circuit. However, it is to be understood that controller 50, as well as sense circuitry 40, may be provided separate from other controlling or sensing circuitry provided with optical switch 10.

Sense circuitry 40 may be provided with controller circuitry 50 on the mirror arrangements 100-1 and 100-2. Alternatively, sensing circuitry 40 may be provided separate from arrangements 100-1 and 100-2, and/or with separately provided controller circuitry 50. While the sense circuitry 40 and controller 50 are shown separately in the schematic of FIG. 1, it should be understood that this is for clarity. The sense circuitry 40 and controller 50 may be integrated into a single sense and control device. Alternatively, the functionality of the sense circuitry 40 and/or controller 50 may be distributed among multiple sensor and controller units.

Figure 2:
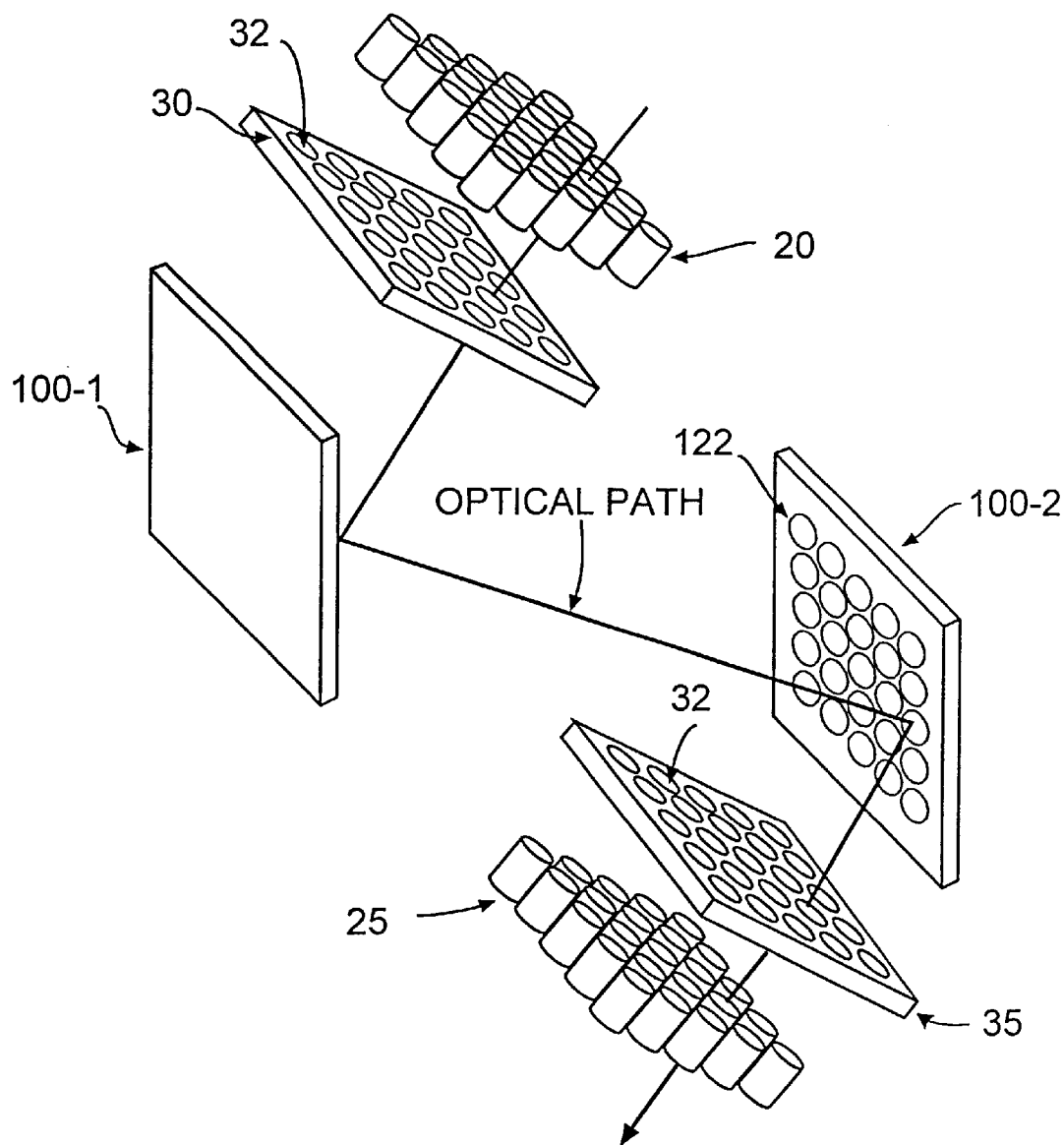
FIG. 2 provides an illustrative embodiment of an optical switch design using micro mirrors in accordance with the present invention.

FIG. 2 shows an example of an embodiment using the steerable micro-mirror arrangement 10 schematically shown in FIG. 1. As shown in FIG. 2, input optical fibers 20 and output optical fibers 25 are arranged in two-dimensional arrays. While input optical fibers 20 and output optical fibers 25 are shown in a rectangular array, it is to be understood that input and output optical fibers may be arranged in any way that allows optical coupling of fibers 20, 25 to respective lenses 32. Similarly, lens arrangements 30 includes micro-lenses 32 arranged in arrays and each are preferably aligned with an input fiber 20 so that light signals from each input fiber 20 will pass through one of the micro-lenses 32. In this way, optical beams emitted from the input fibers 20 will pass through one of the micro-lenses 32 and be directed from the input fibers 20 to one of the micro-mirrors 122 of the first arrangement of micro-mirrors 101-1. The micro-mirror arrangements 100-1, 100-2 and lens arrangement 30, 35 may also be of the types disclosed in U.S. application Ser. No. 09/691,193, which respectively incorporate radiation emitting and detecting elements, and is hereby incorporated by reference. Lens arrangement 35 also may include optical couplers or taps that can be fused with an output fiber 25 to draw a small portion of the optical power switched to an output fiber 25 for monitoring and feedback purposes, such as the types disclosed in U.S. application Ser. No. 09/756, 675, filed Jan. 10, 2001. The micro-mirrors 122 of the first and second arrangements 100-1, 100-2 are formed by microelectromechanical system (MEMS) elements arranged in an array. The first MEMS arrangement 100-1 is positioned at an angle to lens array 30 and generally faces the second MEMS arrangement 100-2 with some offset. The second MEMS array 100-2 is positioned at an angle to the second lens array 35. Accordingly, an optical path from an input fiber to an output fiber traverses a generally "Z" shaped path, as illustrated in FIG. 2. As noted above, one or more lenses or other optical devices may be interposed between the first and second MEMS arrays 100-1, 100-2. In such a case, the lens(es) may refract the light beams as they pass between the MEMS arrays 100-1, 100-2. Notwithstanding, the beam path from the input fiber to the output fiber still generally may be Z-shaped.

As shown in FIG. 2 with a single optical beam, the first lens array 30 receives the input optical beam from the input optical fibers 20 at a micro-lens 32 and directs the input beam to a movable micro-mirror 122 of the first MEMS arrangement 100-1. Depending on the angular position of the movable micro-mirror 122, the input optical beam is reflected to a selected movable micro-mirror 122 of the second MEMS arrangement 100-2. The movable micro-mirror 122 of the second MEMS arrangement 100-2 reflects the input optical beam through a lens 32 of the second lens array 35 to a selected one of the output optical fibers 25. Thus, the optical beam passes out of the input optical fiber, passes through a lens 32 of the first lens array 30, is reflected by the first and second MEMS arrangements 100-1, 100-2, passes through a lens 32 of the second lens array 30, and is directed into a selected output optical fiber 25.

Figure 3A:
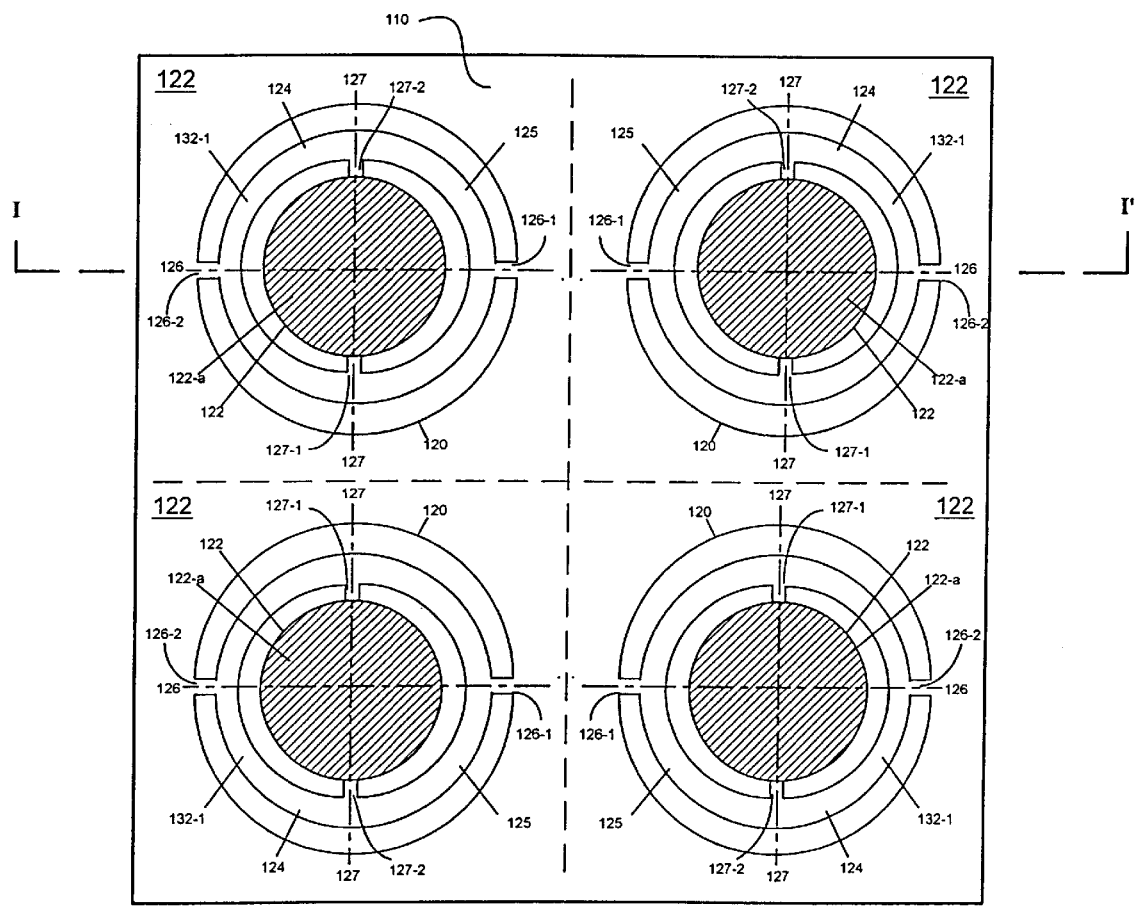
FIG. 3a provides a top view of an illustrative optical switch that includes movable micro-mirrors in accordance with the present invention.
Figure 3B:
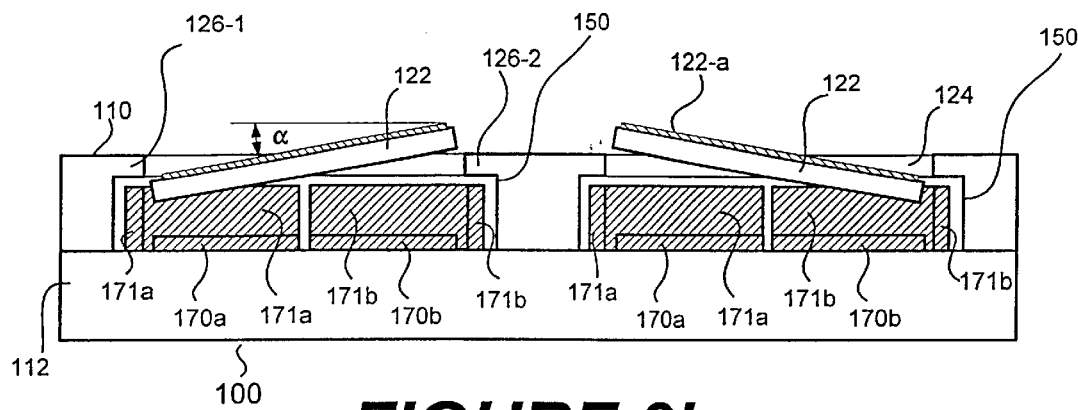
FIG. 3b provides a cross-sectional view of FIG. 3a taken along line I–I'.
Figure 3C:
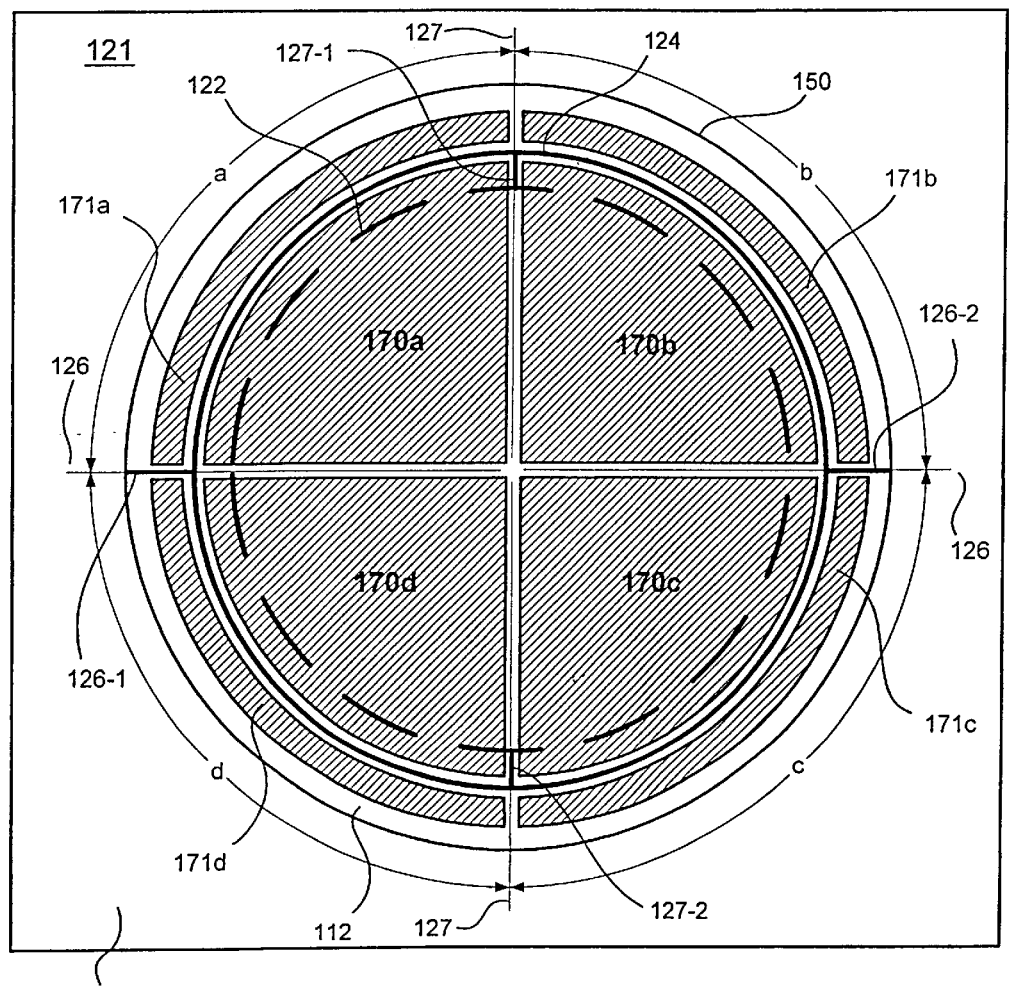

FIGS. 3a to 3c illustrate top and cross-sectional views of an exemplary MEMS micro-mirror arrangement that may use the temperature sensing and temperature control elements of the present invention. For example, the MEMS micro-mirror arrangement exemplified by FIGS. 3a to 3c may form part of a MEMS micro-mirror arrangement 100, such as shown in FIG. 2. FIG. 3b represents a cross-section of the MEMS micro-mirror arrangement taken along axis I–I' of FIG. 3a. FIG. 3c is a plan view intended to provide a simplified rendering of the bottom portion of the MEMS micro-mirror arrangement shown in FIG. 3b.

The MEMS micro-mirror arrangement 100 may be formed using MEMS technology. Of course, this is exemplary and other technologies may be used consistent with the present invention. The arrangement 100 includes a substrate 110, which may be formed, for example, of single crystalline silicon, on which multiple micro-mirrors are formed in an array. FIG. 3a shows four micro-mirrors in a rectangular array for purposes of explanation. It should be understood that substrate 110 may include any number of micro-mirrors (one or more) and that the micro-mirrors may be arranged in any way. More particularly, the substrate 110 includes a plurality of micro-mirrors 122 and corresponding mirror mounts 124 for mounting the micro-mirrors 122. The micro-mirrors 122 may be formed with a conductive coating, such as gold, to form conductive mirror plate 122-*a* and provide a reflective surface. Each micro-mirror 122 and corresponding mirror mount 124 form a movable micro-mirror unit 120. FIG. 3a shows four movable micro-mirror units 120 for purposes of illustration. Of course, the micro-mirror arrangement 100 may have more or fewer than four movable micro-mirror units 120.

FIGS. 3a–3c show rectangular mirror cells 121, each including a-micro-mirror unit 120, for purposes of illustration. However, a micro-mirror cell 121 may assume other shapes, such as circular, triangular or honeycomb shapes. Micro-mirrors also may be formed into groups including two or more cells 121. In an arrangement having grouped cells, micro-mirror cells 121 may be arranged adjacent to one another, in a non-adjacent arrangement, or in an arrangement having a combination of adjacent and non-adjacent cells 121.

As shown in FIG. 3a, each mirror mount 124 may be formed as a gimbal. In particular, the mirror mount 124 includes a mounting arm 125 coupled to the remainder of the substrate 110 by pivot arms 126-1, 126-2 and coupled to the micro-mirror 122 by pivot arms 127-1, 127-2. Pivot arms 126-1 and 126-2 enable the mounting arm 125, and thus the micro-mirror 122, to pivot with respect to the substrate 110 about a first axis 126. Pivot arms 127-1 and 127-2 enable the micro-mirror 122 to pivot with respect to the mounting arm 125 about a second axis 127 orthogonal to the first axis 126. Pivot arms 126-1, 126-2, 127-1, 127-2 may be formed as torsional elements, such as serpentine springs or other elastic/pivoting devices that provide resistance and restoration forces to micro-mirror 122. FIG. 3a shows the mounting arm 125 to be circular for purposes of illustration and not by way of limitation. Of course, the mounting arm 125 may be, for example, rectangular, elliptical, or other closed loop shape, or U-shaped, or arcuate.

The micro-mirror arrangement 100 further includes a sub-mount 112 beneath the substrate 110. The sub-mount 112 may be formed, for example, of silicon or another semiconductor material or compound, or an insulative material on which a semiconductive material or compound may be formed. Micro-mirror arrangement 100 may optionally include a spacer layer (not shown) that separates the substrate 112 from substrate 110. In such an arrangement, substrate 112 can be silicon, ceramic, epoxy, polyimide, an oxide or other like materials, and the spacer layer can be silicon, ceramic, epoxy, polyimide, an oxide or other like materials. In addition, the spacer can be omitted and mesa-like extensions of the substrate 112 (not shown) can be used to support a plurality of substrates 110.

FIG. 3c provides a top view of one mirror cell 121. Similar to FIGS. 3a and 3b, FIG. 3c is intended to provide a simplified rendering of the arrangement of position control and/or capacitance sensing electrodes 170 and/or 171 on submount 112 for purposes of explaining the invention. Outlines of mirror mount 124 and micro-mirror 122 are schematically shown for purposes of generally illustrating the relative position of micro-mirror 122 to the underlying electrode arrangement.

As shown in FIG. 3c, sub-mount 112 includes a plurality of electrodes 170 and/or 171 arranged in groups corresponding to the movable micro-mirror assemblies 120 and, in particular, to the micro-mirror 122 and mounting arm 125 of the movable micro-mirror units 120. Each of the electrode groups is located in within cavities (mirror wells) 150 defined by substrate 110 and submount 112. As shown in FIG. 3c, each mirror well may include four mirror quadrants a, b, c, and d that are defined by electrode axes 128 and 129. While electrode axes 128 are illustrated as being offset from axes 126 and 127, the electrode axes may be respectively aligned with axes 126 and 127. It is to be understood that any angular relationship may exist between the electrode axes and mirror rotational axes may as long as the electrodes are driven accordingly.

Electrodes 170 are provided on a bottom surface of mirror well 150 and underlie a micro-mirror 122. Electrodes 170 are positioned under micro-mirror 122 and may have a major plane substantially parallel with an upper surface of submount 112. It is to be understood that major surfaces of electrodes 170 may not be planar or flat with respect to a surface of submount 112. For example, electrodes 170 may be positioned at an angle with respect to an upper surface of submount 112, or include segmented portions positioned at different heights relative to one another. Sidewall electrodes 171 also may be included within mirror well 150 in segmented portions along the wall of well 150 and positioned at a periphery of micro-mirror 122 to substantially surround electrodes 170. Electrodes 171 are shown as a "head-less" configuration having a height that is less than the height of the mirror well 150, such as the types described in copending application Ser. No. 09/772,084, filed Jan. 30, 2001, and hereby incorporated by reference. Sidewall electrodes may alternatively extend vertically to substantially the height of the well and/or be formed in a plurality of sidewall electrodes of different height.

Electrodes 170 and/or sidewall electrodes 171 act on the micro-mirror 122 and mounting arm 125 to control the angular position of the micro-mirror 122 by electrostatic force. In the embodiment of FIG. 3c, electrodes of quadrant a and quadrant c control the angular position of the micro-mirror 122 about axis 126. Electrodes of quadrant b and quadrant d control the angular position of the micro-mirror 122 about axis 127. Consequently, by appropriate control of electrodes 170a–170d and/or sidewall electrodes 171a–171d, the surface angle of micro-mirror 122 may be controlled. Accordingly, micro-mirror 122 can be used to steer an incident light beam to a particular location, a function useful in optical switches.

Mirror 122 may be actuated by an electrostatic force field that exists between conductive portions of mirror 122 and the arrangement of mirror control and/or capacitance sense electrodes 170, and/or vertically elongated arrangement of control and/or capacitance sense sidewall electrodes 171, when position control voltages are applied to electrodes 170 and/or electrodes 171. The electrostatic force field results from positive (negative) charges that accumulate on the control/sense electrodes 170 and/or 171 upon applying position control voltages. Positive (negative) charges on electrodes 170 and/or 171 induce negative (positive) charges in nearby conductive portions of micro-mirror 122. According to Coulomb's law, a force between a first and second object having quantities of charge Q1 and Q2, respectively, is proportional to each of the charges Q1 and Q2 and inversely proportional to the square of the distance between them. Hence, when an induced charge exists in a conductive portion of mirror 122 by a voltage applied to electrodes 170 and/or 171, an attractive force will act on the mirror 122 (using electrodes 170 and/or 171 as a reference point). However, since axes 126 and 127 support mirror 122, this attractive force may cause rotation of mirror 122 about one or both of axes 126 and 127, and thus provide torque to mirror 122 about these axes.

Since the attractive force on micro-mirror 122 is proportional to an electric field between an electrode 170 and/or 171 and an associated micro-mirror conductive portion, electric fields existing between electrodes 170 and/or electrodes 171 and the conductive portion of micro-mirror 122 supply torque on the mirror about mirror axes 126 and/or 127, and thus move micro-mirror 122 into an angular position. In each electrode quadrant a to d, electrodes 170 and sidewall electrodes 171 may be driven with control voltages simultaneously, independently, or in a cooperative fashion to provide electric fields that angularly position a micro-mirror 122. While the description above assumes that the mirrors are actuated by electrostatic force, it should be appreciated that the mirrors may be actuated by other alternative or additional mechanisms consistent with the present invention.

Figure 4:
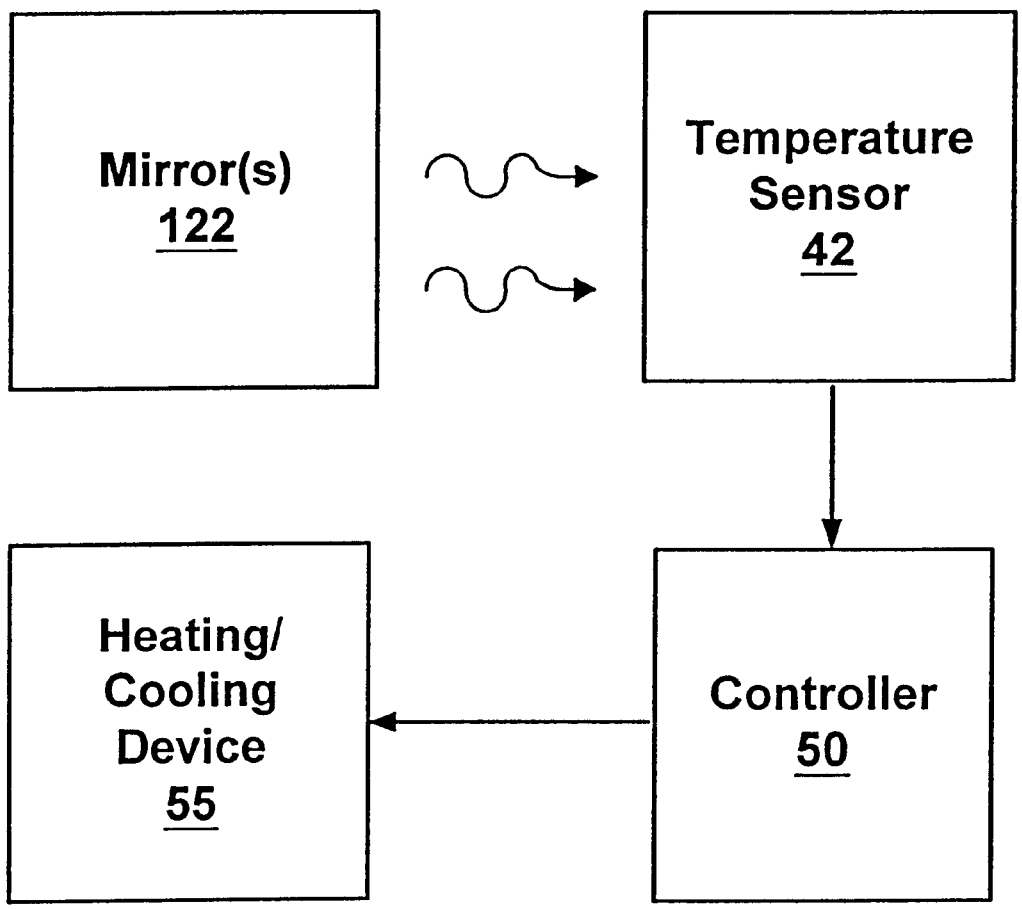
FIG. 4 provides a schematic of an illustrative temperature control system in accordance with the present invention.

FIG. 4 provides a generalized schematic of an embodiment of a temperature control system 400 in accordance with the present invention that may be used in a micro-mirror arrangement, for example, the MEMS micro-mirror arrangement exemplified by FIGS. 3a to 3c. The micro-mirror array may include one or more of the temperature control systems 400, but only one is shown for purposes of explanation. As shown in FIG. 4, a temperature sensor 42 may be provided on a micro-mirror 122, within a micro-mirror well 150, adjacent one or more micro-mirrors 122, or elsewhere on or in a switching substrate 100. The temperature sensor 42 senses the temperature at or near the micro-mirror(s) 122 and generates a sensed temperature signal indicative of the temperature. The temperature sensor 42 may be, for example, a P-N junction device or other known temperature-sensing devices, such as temperature variable resistance devices (e.g., a thermistor). For example, a temperature of a region in a switching substrate 100 may be determined by incorporating a P-N junction device in the substrate. P-N junction devices may include discrete diodes or other devices, such as transistors, that include one or more P-N junctions. A P-N junction has a temperature variable forward voltage drop that may be measured at a particular junction temperature by operating the P-N junction at two or more current densities. The absolute temperature of the device junction, and thus the temperature of the area occupied by the junction, is proportional to differences in the measured forward voltage drop at the two or more current densities. Alternatively, the forward voltage drops of identical P-N junction devices operating at different current densities may be utilized to determine an absolute temperature of a substrate region that includes the devices. The present invention may use any of the foregoing methods and/or other known methods for determining a temperature of the switching substrate 100.

As shown in FIG. 4, temperature sensor 42 is thermally coupled with mirrors formed in the switching substrate 100. A controller 50 may generate and provide a control signal to one or more heating and/or cooling device 55 positioned on or near micro-mirrors 122 in response to the sensed temperature signal. A suitable heating device may be a resistor, for example. The cooling device may be a thermoelectric cooler (TEC) or a thermionic cooler, but any suitable cooler may be used.

The control signal of the controller 50 may be indicative of the relative increase or decrease of temperature desired. Controller 50 may compare a voltage or current level of the sensed temperature signal with levels of sensed temperature signals from one or more additional sensors coupled with control circuit 50. Control circuit 50 may then activate one or more heating and/or one or more cooling devices 55 located on the switching substrate 100 to bring substrate to a desired level of temperature uniformity. In one exemplary embodiment, the operating temperature of a switching substrate may assume any one of a plurality of temperature values in a desired operating temperature range. Controller 50 may attain a substantially uniform switching substrate temperature and within the desired temperature range by providing signals to heating and/or cooling devices 55 that are based on a least amount of energy needed to attain a value within the desired range. For environments having variable ambient temperatures, this embodiment may provide an efficient use of energy since controller 50 may control the substrate temperature at any one of a plurality of set points within the desired operating temperature range. For example, controller 50 may choose a set point in the desired operating range that requires a least amount of energy consumed by all switch cooling and/or heating devices 55 used to raise and/or lower the temperature of the substrate, or areas of the substrate.

Alternatively, controller 50 may appropriately activate heating and/or cooling devices 55 to substantially maintain an area of the switching substrate 100 at a predetermined set point temperature. The set point temperature may be set or adjusted during manufacture of the optical switch, its installation, or during operation. For example, the set point temperature may addressable by other control equipment of or for the switching substrate 100. The set point temperature may be transmitted and stored in the controller 50 through the other control equipment. The control signal may simply activate the heating and/or cooling device, which may remain activated until turned off by the controller 50 or for a predetermined time. As another example, the switching substrate may be warmed by heating devices 55 to maintain a desired operating temperature. If the ambient temperature rises above the desired temperature, the controller 50 may signal one or more of the heating devices 55 to provide less heat to the switching substrate in order to maintain the substrate at the desired operating temperature. Of course, in environments where an ambient temperature may exceed a desired set point, cooling devices 55 may be used to reduce temperature in "hot" substrate areas. In some embodiments, the heating and/or cooling device 55 may include only heating element(s) or cooling element(s). In other embodiments, the element(s) may operate to heat and/or cool the micro-mirrors, in accordance with the control signals generated by controller 50. For example, separate heating and cooling elements 55 may be provided on or near the micro-mirrors.

Controller 50 may include temperature sense circuitry that provides a signal to, and senses a response from a temperature sensor 42. For example, sense circuitry in controller 50 may provide two current density signals to a P-N junction device on switching substrate 100 and measure the difference in the voltage drops between the two applied current densities, as described above. Sense circuitry also may include a circuit for generating a signal that is indicative of the sensed temperature from the measured difference in voltage drop across the P-N junction. Alternatively, sense circuitry may include other temperature signal generating devices, such as a resistor bridge circuit including one or more a variable resistor sensors 42.

Controller 50 may employ analog and/or digital designs. The control and/or sensing circuitry may be integrated into switching substrate 100, on the sub-mount 112, provided by one or more separate driver chips, or provided by any combination of the foregoing. Coupling between any of control circuitry 50, temperature sensor 42, heater devices 55, and/or cooler devices 56 may be achieved using conductive traces or wires provided on submount 112 and/or conductive vias formed in the submount 112, or other conductive paths.

Figure 5:
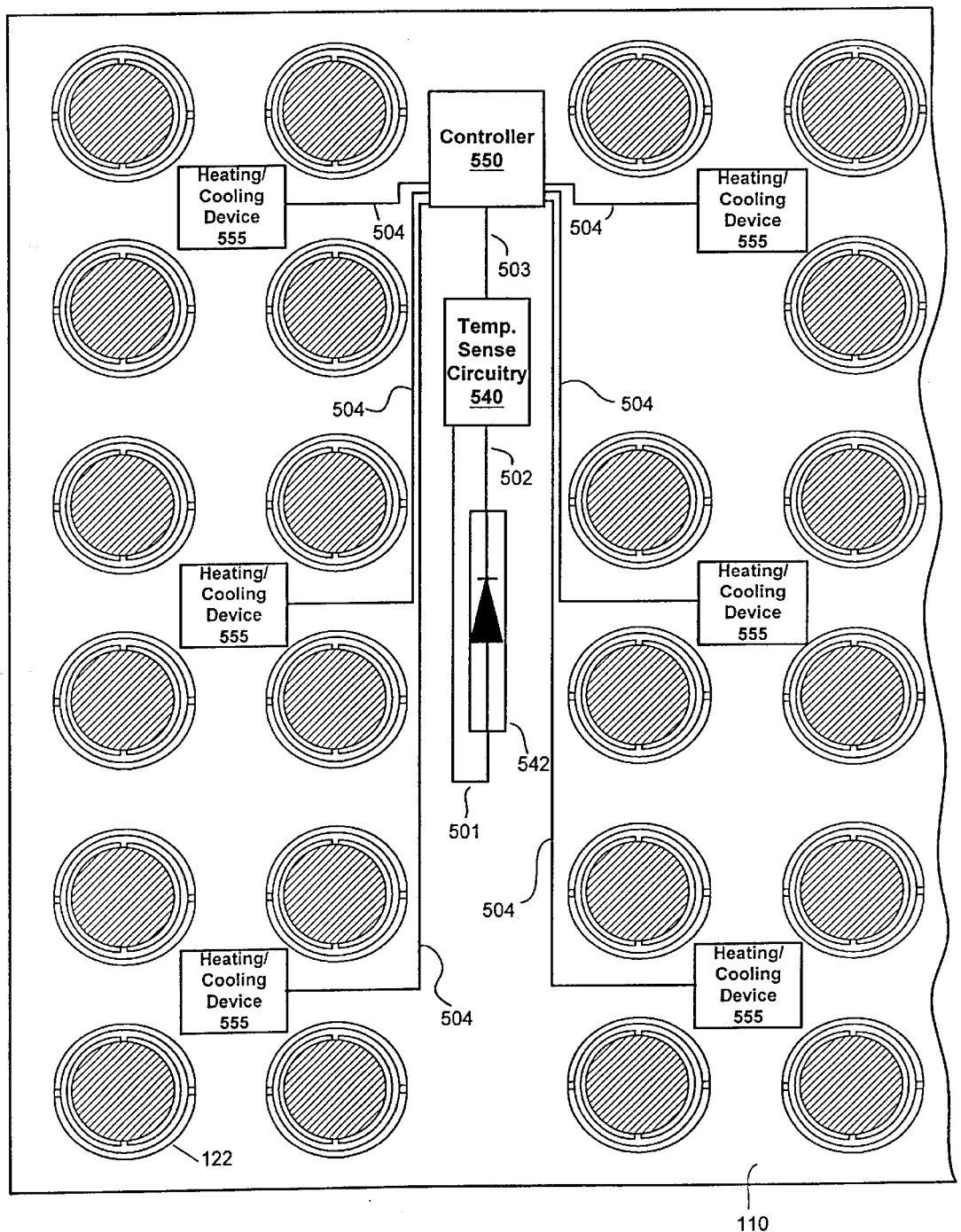
FIG. 5 provides a first exemplary embodiment of a temperature sensing and control system in accordance with the present invention.

FIG. 5 is an illustration of a temperature sensing and control system in accordance with a first exemplary embodiment of the present invention. As shown in FIG. 5, a plurality micro-mirrors 122 are distributed in the form of an array on substrate 110 of a mirror arrangement 100-1 or 100-2. A P-N junction diode temperature sensor 542 is provided in switching substrate 100 within a central region of a mirror group in the mirror array, and is electrically connected with temperature sense circuitry 540 with conductors 501 and 502. Temperature sensor 542 may be the only temperature sensor provided on the substrate 100. Alternatively, several sensors may be provided to respectively monitor several mirror groups on a common substrate. Temperature sense circuitry 540 is connected with signal path 503 with controller 550. Controller 550 is shown connected by signal paths 504 to one or more heater and/or cooler devices 555 provided with a plurality of mirrors of a mirror group. Each mirror group is shown in FIG. 5 as including four mirrors 122, but each mirror group may include more or less than four mirrors. For example, in some applications, a mirror group may include every micro-mirror on a switching substrate 100 and one monolithic heating and/or cooling device may be provided to heat/cool the entire substrate. As described above, sense circuitry 540 may be provided on the surface substrate 110 with control circuit 550, provided separately on the substrate surface, or provided elsewhere on the switching substrate 100.

In operation, the temperature sense circuitry 540 shown in FIG. 5 provides controller 550 with a sensed temperature signal based on a signal received from sensor 542. Controller circuit 550 may activate heating and/or cooling devices 555 based on a comparison of one or more additional temperature sensed mirror groups in the micro-mirror array. Activation of heating and/or cooling elements 555 may instead be based on a sensed temperature that falls below or rises above an acceptable threshold reference temperature value.

Figure 6:
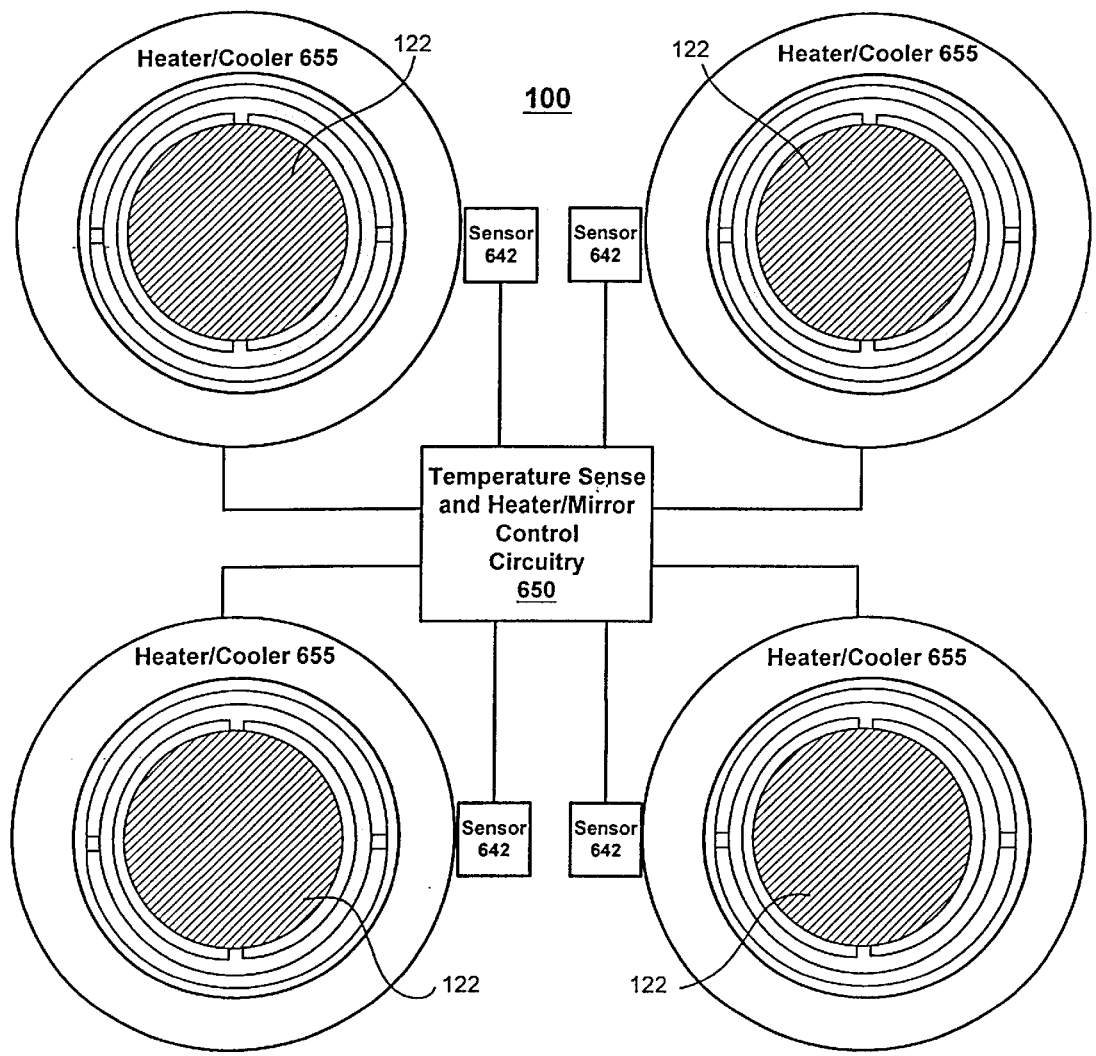
FIG. 6 provides a second exemplary embodiment of a temperature sensing and control system in accordance with the present invention.

FIG. 6 is an illustration an exemplary temperature control system in accordance with a second embodiment of the present invention. As shown in FIG. 6, heating and/or cooling devices 655, and temperature sensors 642, are positioned near each micro-mirror 122 provided on a switch substrate 100. A sensor 642 and a heating/cooling device 655 may instead be provided on each micro-mirror 122 or within a well containing drive electrodes underlying the mirror. Sensing circuitry for receiving signals from sensors 642 is shown as included within a controller 650. Sensing circuitry may instead be provided separate from controller 650 and coupled to the controller along a signal path from a mirror or group including a plurality of mirrors. Controller 650 may be provided near or remote from the illustrated mirror group, as described above. While controller 650 is shown as providing control to a group of four micro-mirrors 122, controller 650 also may represent a controller connected with only one mirror, or connected to additional micro-mirrors 122 on a switch substrate 100 (not shown).

While heating/cooling devices 655 are shown as surrounding micro-mirrors 122, it is to be understood that each heating element/cooling device 655 may be positioned in any location proximal to or on each micro-mirror 122. Alternatively or in a combination with heating or cooling devices provided on or in close proximity to a mirror, a heater and/or cooling device 655 may be included with circuitry provided on switching substrate 100 near a mirror being sensed. For example, a resistor may be provided with mirror drive circuitry to heat the area near a micro-mirror. For cooling the area near a micro-mirror, a thin-film thermionic cooling device may be positioned over circuitry near the mirror or on other areas in proximity of a micro-mirror. For a detailed description of thermionic cooler devices, see U.S. Pat. No. 5,955,772, the contents of which are hereby incorporated by reference.

Figure 7A:
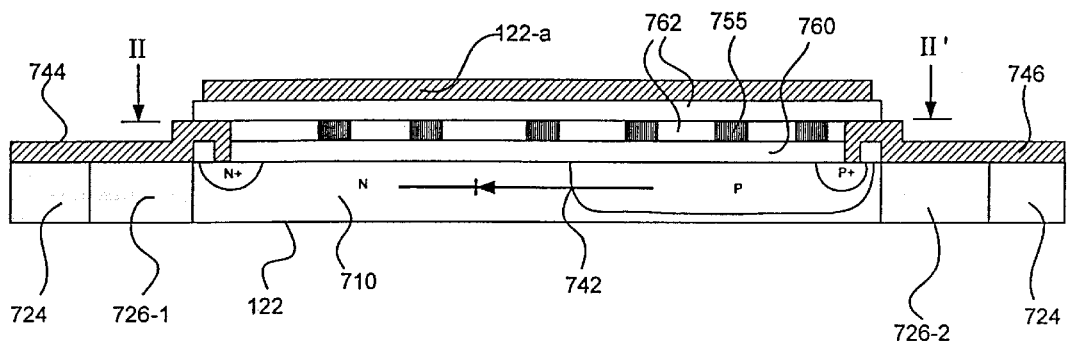
FIG. 7a provides cross-sectional view of a third exemplary embodiment of a temperature sensing and control system in accordance with the present invention.
Figure 7B:
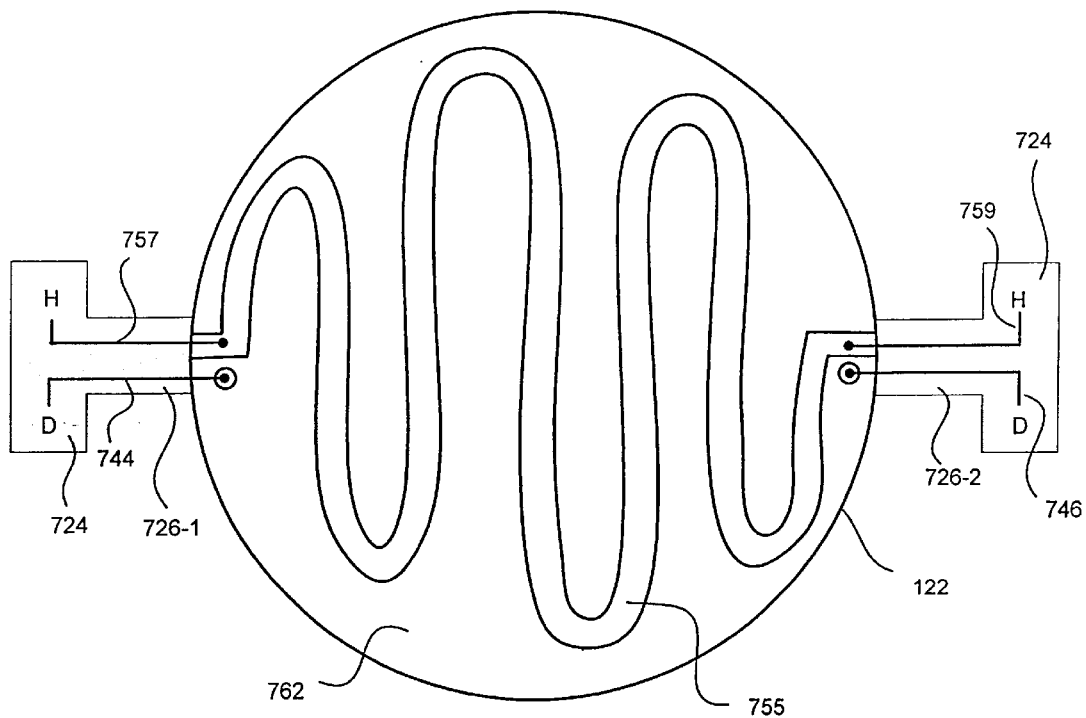
FIG. 7b provides a top view of FIG. 7a as seen from line II–II'.
Figure 7C:
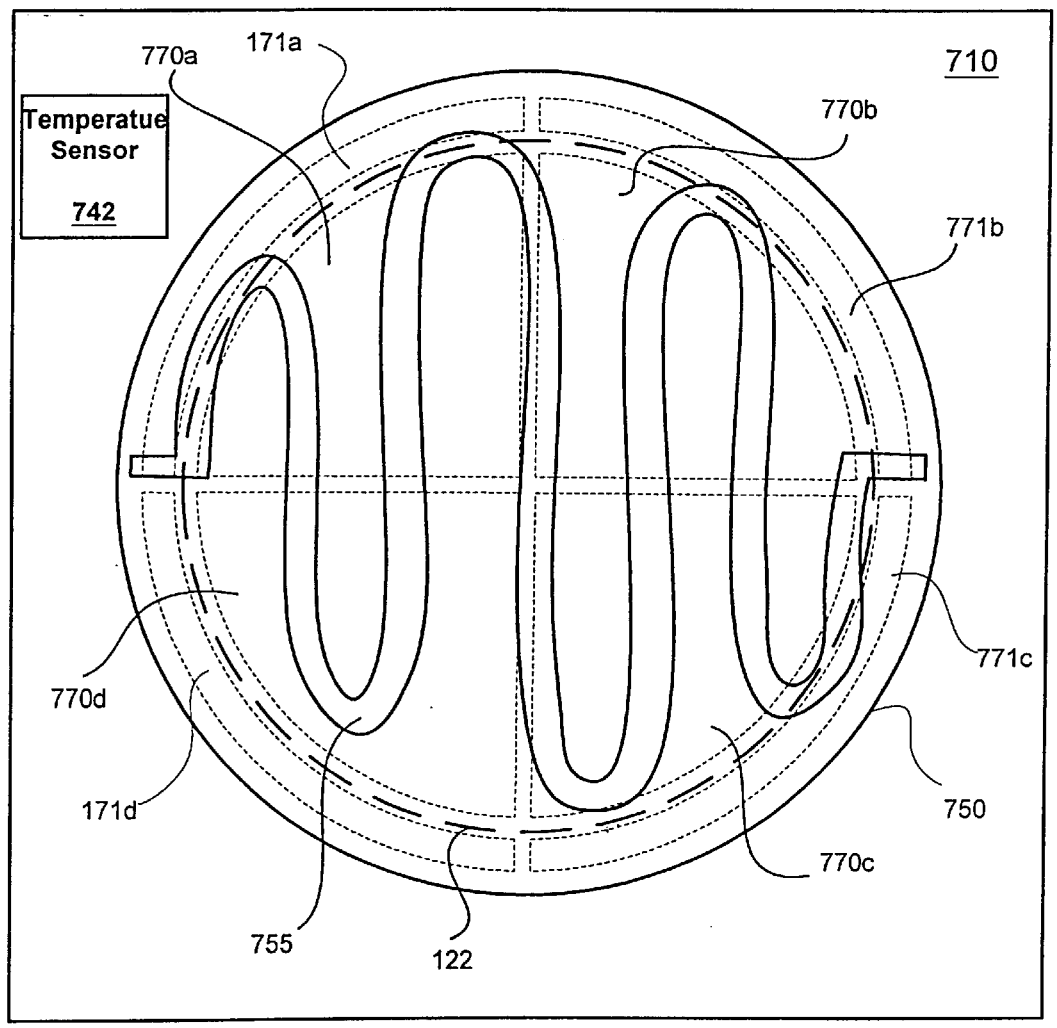
FIG. 7c provides a top view of a fourth exemplary embodiment of a temperature sensing and control system in accordance with the present invention.

FIGS. 7a–7b and 7c respectively illustrate third and fourth exemplary embodiments of temperature control systems in accordance with the present invention where temperature sensing and control is provided to each micro-mirror.

In the third exemplary embodiment illustrated in FIG. 7a, a temperature sensing device 742 and a heater device 755 may be integrated within the structure of a micro-mirror 122. As shown in FIG. 7a, a micro-mirror 122 may be formed with a semiconductor material substrate 710, such as silicon. The micro-mirror material may be doped with n- and p-type dopant materials to form a P-N junction temperature sensor 742. Overlying substrate 710 is an insulating layer 760, such as silicon oxide or nitride material. Formed on insulating layer 760 is a resistance film 755, such a nichrome thin film or other resistance film. A planarizing insulating film 762 is formed over the resistance film to provide a flat surface for reflecting film 122-a. FIG. 7b is a top view of FIG. 7a as viewed from the upper surface film 755 downward. As shown in FIG. 7b, micro-mirror 122 is connected to mirror mount 724 (partially shown) by pivoting structures 726-1 and 726-2. Wiring 744 and 746 couple sensor 742 with sensing circuitry provided with the switch. Wiring 757 and 759 couple heater device 755 with a controller of the switch. Wiring 744, 746, 757 and/or 759 may be provided on mirror mount 724 or in an air bridge configuration spanning the distance from mirror 122 to a surface of switching substrate 100.

Instead of positioning heating devices on a micro-mirror 122, heating devices may be placed within the mirror well and/or integrated into the switching substrate submount. As shown in FIG. 7c, a heating device 755 may be positioned under a drive electrode arrangement 770/771 (shown in outline) at the bottom of a micro-mirror well 750 formed in the switching substrate 710. A temperature sensor 742 may be placed on or adjacent the mirror 122 (shown in outline) to provide a controller (not shown) with a sensed temperature signal. The controller may respond to the sensed temperature signal by providing power to the heating device 755. The heating device warms the area that includes the electrode arrangement 770/771 along the bottom of the well. Heat flowing from device 755 is transferred to the micro-mirror 122 through the switching substrate and the gas within the well 750. As the mirror warms, the controller may reduce or turn off power to the heating element. Hence, a controller may maintain the temperature of micro-mirrors in a mirror supporting substrate at a substantially uniform value. Alternatively or in combination with heating devices underlying a micro-mirror electrode arrangement, heating devices may be positioned within the well. For example, heating elements may be positioned on the well floor adjacent electrodes 770 and/or 771. Of course, the embodiments described above also may include one or more cooling devices for reducing a temperature of a micro-mirror 122, such as those described above, and/or other cooling arrangements, such as the fifth exemplary embodiment described below.

Figure 8A:
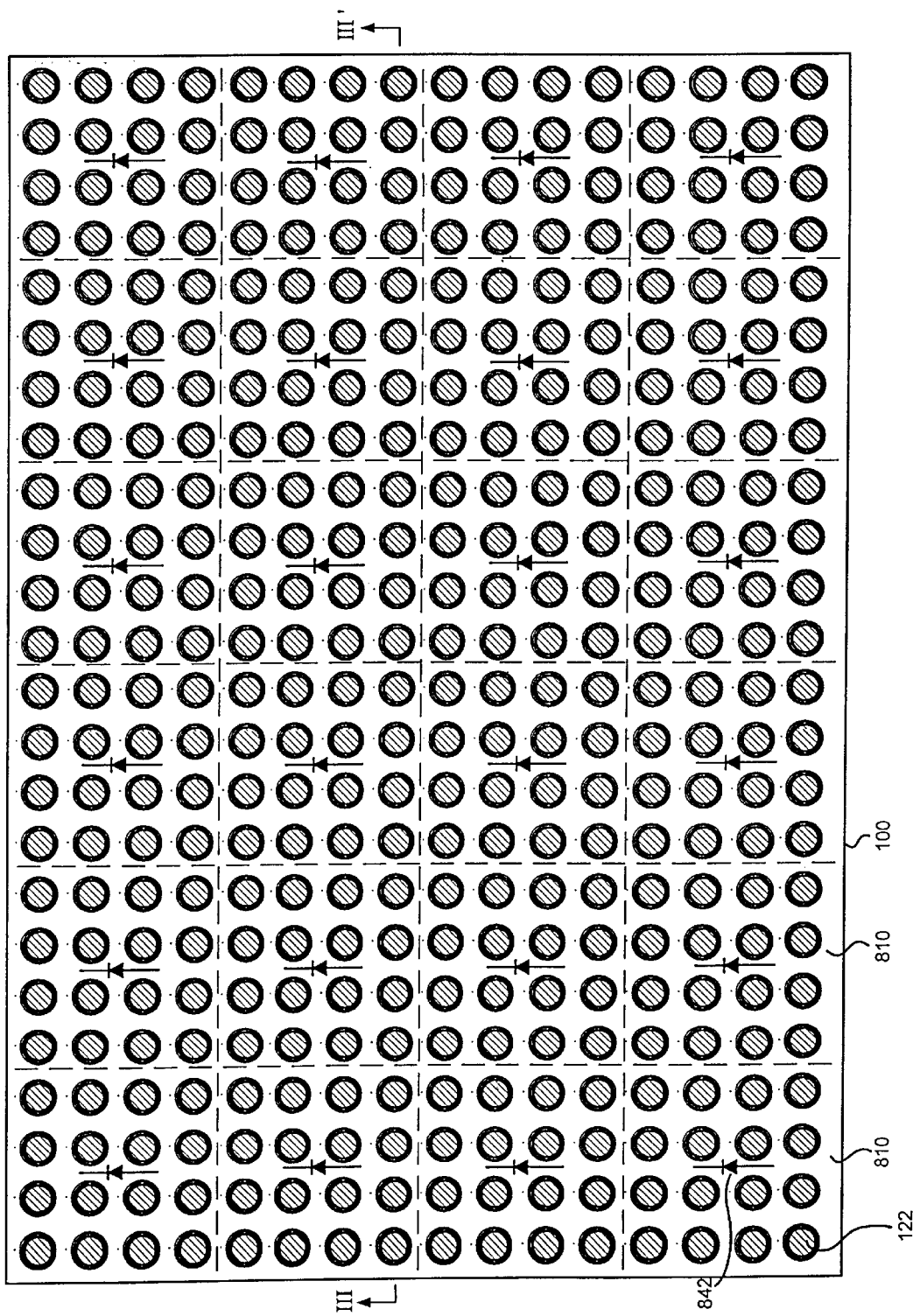
FIG. 8a provides a fifth exemplary embodiment of a temperature sensing and control system in accordance with the present invention.
Figure 8B:
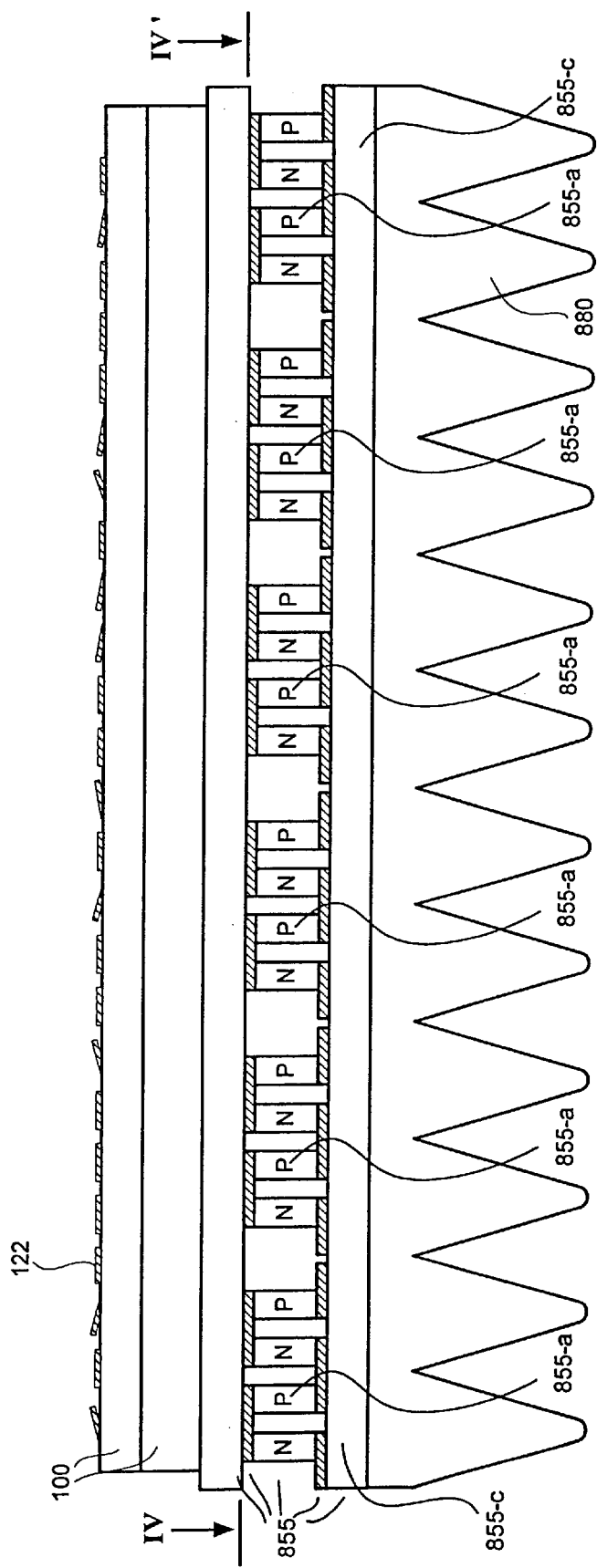
FIG. 8b provides a cross-sectional view of FIG. 8a taken along line III–III'.
Figure 8C:
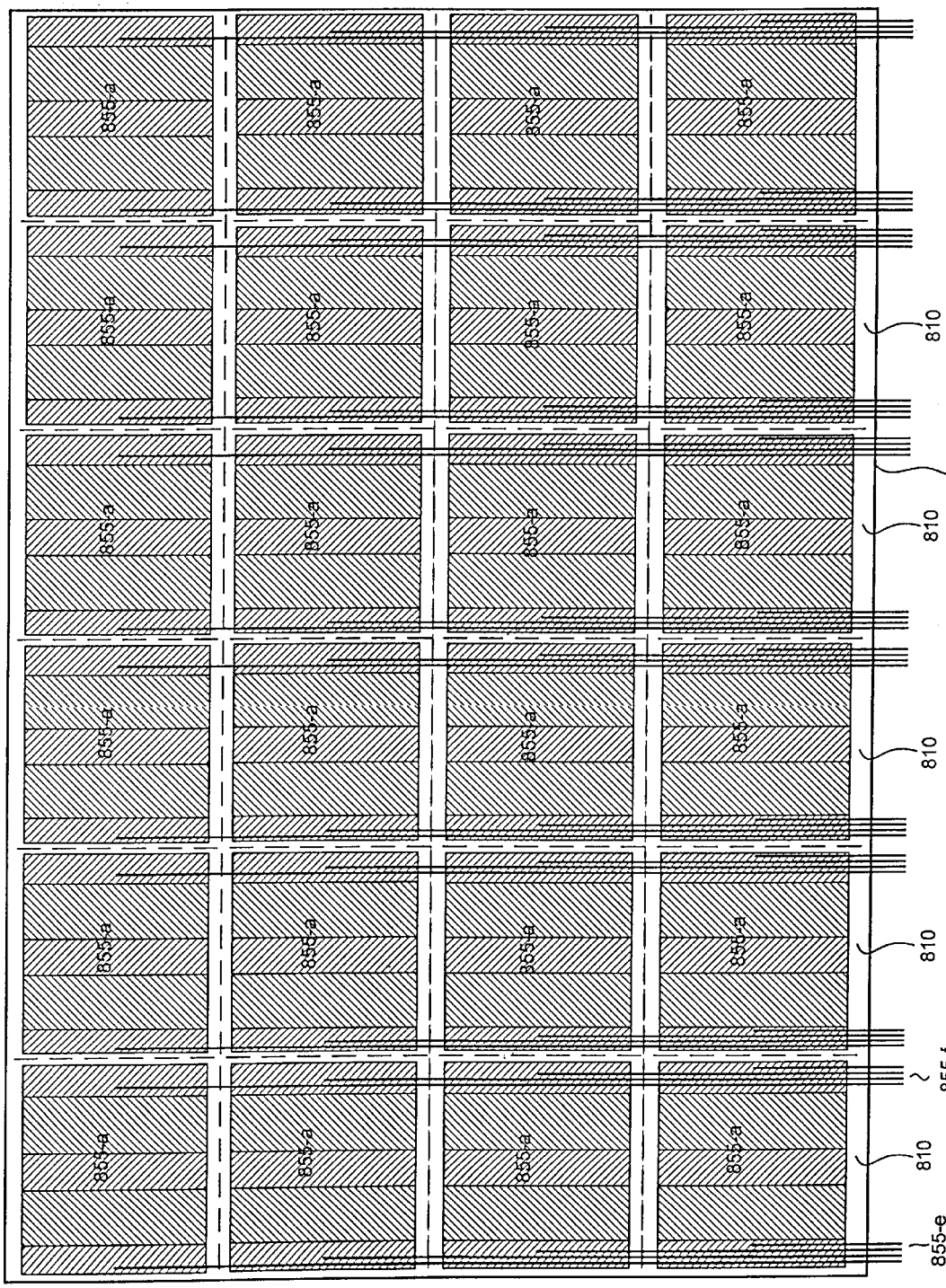
FIG. 8c provides top view of FIG. 8b as seen from line IV–IV'.
Figure 9A:
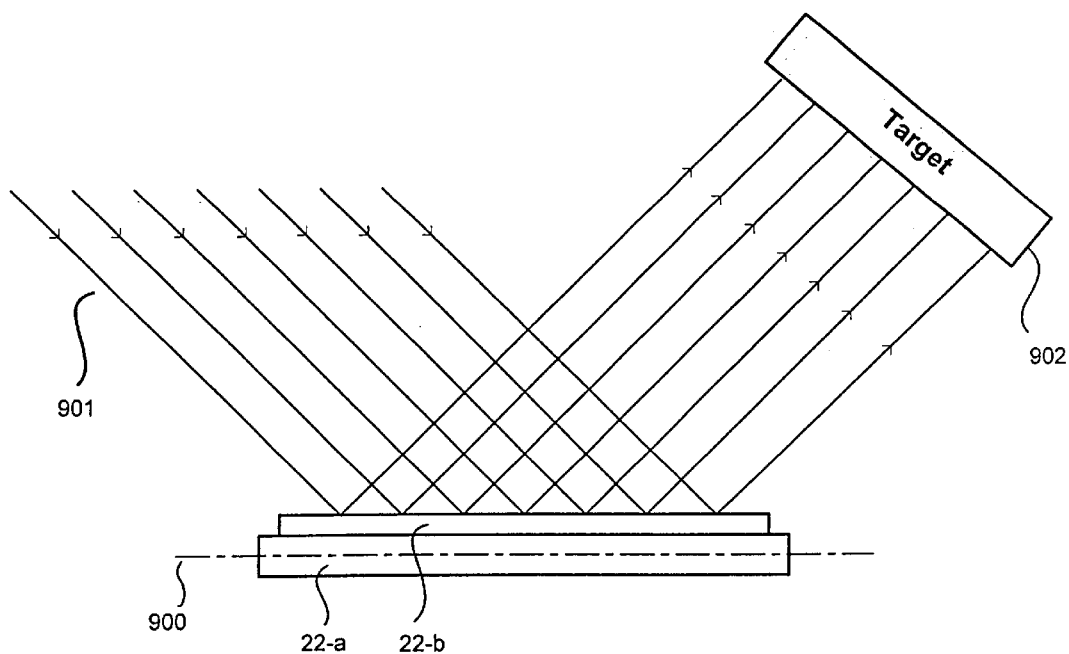
FIG. 9a provides a cross-sectional view of a micro-mirror having a substantially flat reflecting surface.
Figure 9B:
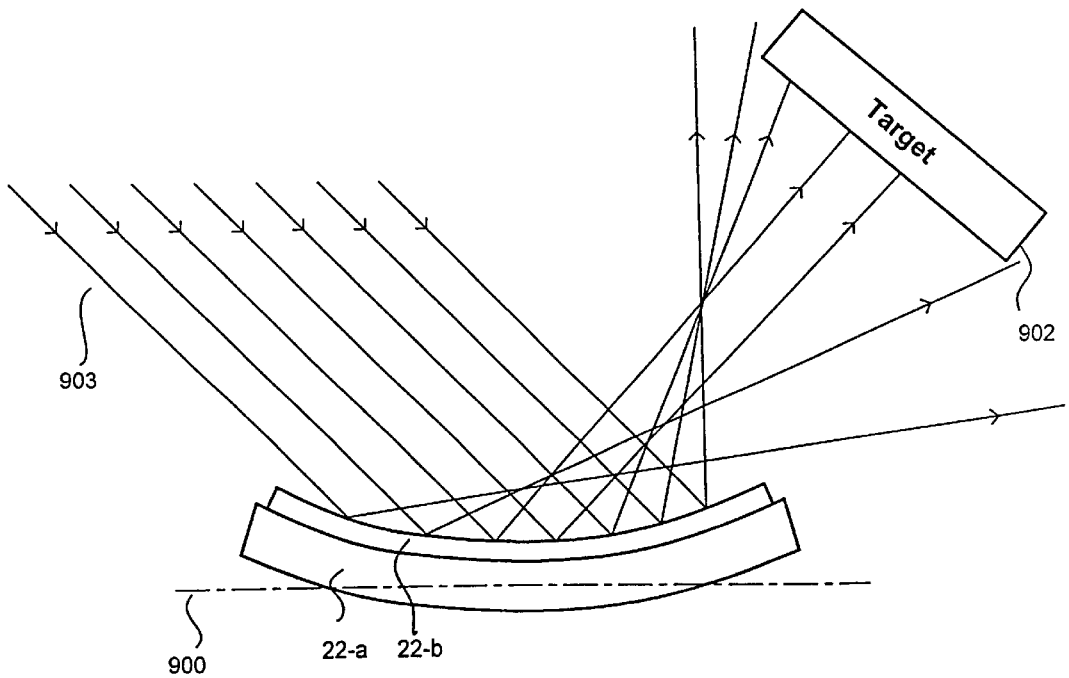
FIG. 9b provides a cross-sectional view of a micro-mirror having a curved reflecting surface.

FIGS. 8a to 8c illustrate an exemplary temperature control system in accordance with a fifth embodiment of the present invention. As shown in FIG. 8a, a switching substrate 100 contains a 16×25 (N×M) array of micro-mirrors 122. Substrate 100 also includes a plurality of sensing regions 810, each comprising 16 mirrors. It is to be understood that the foregoing 16×25 array and the 16-mirror groups are presented by way of example. Any value of N and M, and any number of mirrors X may be used to respectively form a mirror array and mirror group in the array, where N, M, and X may take on any number of the set $\{1, 2, 3 \ldots\}$. Furthermore, micro-mirrors of the present invention may be formed into non-rectangular arrays or other symmetric and/or asymmetric arrangements. In each sensing region 810, a temperature sensor 842 is provided to sense the temperature of the region. As described above, sensors 842 may be coupled with sensing and controller circuits that activate heating and/or cooling devices.

As shown in FIG. 8b, the present embodiment uses a cooler device 855 that includes separately controllable TEC 855-a subunits sandwiched between plates 855b and 855c, for example, ceramic plates. Cooler device 855 is positioned on the backside of switching substrate 100 so that each TEC 855-a may allow heat to transfer from a sensing region 810 to a corresponding cooler subunit 855-a. A heat sink device 880 may be placed in thermal contact with the cooler device 855 to provide additional heat dissipation from the substrate 100.

FIG. 8c illustrates an exemplary array of TECs 855-a as seen from above a plane defined by the bottom of ceramic plate 855b. Dotted lines that section regions 810 in FIG. 8a also are shown in FIG. 8c to illustrate an exemplary positional relationship between regions 810 of the switching substrate 100 and respective TEC subunits 855-a. Wiring 855e and 855f is provided along each row of TEC subunits 855-a. An appropriate DC bias applied between a pair of the wiring 855e and 855f will cause a selected TEC subunit 855-a to pump heat from its corresponding region 810 of the switching substrate 100. Wiring 855e and 855f may be coupled to circuitry of a controller that may address a particular TEC subunit 855-a to cool its corresponding region 810 based a temperature sensed by one or more sensors 842. As described above, each region may be separately controlled to a set value, or controlled in relative fashion with other sensed temperature values on the switch substrate. While separately controllable TEC units and/or heating elements are described above, it is to be understood that a monolithic cooling element and/or heating element, or commonly controlled groups of heating and/or cooling elements may be provided over one or more surfaces of a switching substrate 100 to cool/heat the entire substrate.

As should be clear from the embodiments described above, the present invention presents a system for controlling temperature in an optical switch having movable micro-mirrors. Control of switch temperature reduces the occurrence of curvature in micro-mirrors that would otherwise result in undesirable signal losses. Thus, the present invention provides a structure that is useful in optical switching architectures requiring precise and stable switching.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A temperature control system for one or more micro-mirrors of an optical device, comprising:
   a temperature sensor located adjacent a micro-mirror of an optical device, wherein the temperature sensor senses the temperature near the micro-mirror and generates a temperature signal indicative of the sensed temperature;
   a thermal element located adjacent the micro-mirror and that adjusts the temperature near the micro-mirror; and
   a temperature controller that compares the temperature signal to a signal indicative of a desired temperature and generates control signals based on the comparison for controlling the thermal element to adjust the temperature adjacent the micro-mirror until the temperature near the micro-mirror corresponds to the desired temperature.

2. The temperature control system according to claim 1, wherein said temperature sensor is located on the micro-mirror.

3. The temperature control system according to claim 1, wherein said thermal element is located on the micro-mirror.

4. The temperature control system according to claim 1, wherein the temperature sensor and thermal element are formed on a MEMS-based optical switching substrate.

5. The temperature control system according to claim 1, wherein the thermal element comprises a heating element.

6. The temperature control system according to claim 5, wherein the heating element comprises a resistor.

7. The temperature control system according to claim 1, wherein the thermal element comprises a cooling element.

8. The temperature control system according to claim 7, wherein the cooling element comprises a thermoelectric cooler.

9. The temperature control system according to claim 1, wherein the thermal element is a heating and cooling element.

10. An optical switching substrate comprising:
    a substrate;
    a plurality of micro-mirrors formed on the substrate and tiltable relative to the substrate about first and second axes;
    a temperature sensor located on the substrate adjacent at least one of the micro-mirrors, wherein the temperature sensor senses the temperature near the at least one micro-mirror and generates a temperature signal indicative of the sensed temperature;
    a thermal element located on the substrate and in thermal contact with the at least one micro-mirror and that adjusts the temperature near the at least one micro-mirror; and
    a temperature controller that receives the temperature signal and generates control signals for controlling the thermal element to adjust the temperature adjacent the micro-mirror until the temperature near the micro-mirror corresponds to a desired temperature.

11. The optical switching substrate according to claim 10, wherein said temperature sensor is located on the micro-mirror.

12. The optical switching substrate according to claim 10, wherein said temperature sensor is located on said substrate between at least two of the micro-mirrors.

13. The optical switching substrate according to claim 10, wherein the thermal element is located between at least two of the micro-mirrors.

14. The optical switching substrate according to claim 10, further comprising a plurality of thermal elements distributed over a surface of the substrate between the micro-mirrors.

15. The optical switching substrate according to claim 10, further comprises a plurality of temperature sensors and a plurality of thermal elements, wherein at least one of the temperature sensors and at least one of the thermal elements is provided for each of the micro-mirrors.

16. The optical switching substrate according to claim 10, further comprises a plurality of temperature sensors and a plurality of thermal elements, wherein at least one of the temperature sensors and at least one of the thermal elements is provided for a mirror group comprising a plurality of the micro-mirrors.

17. The optical switching substrate according to claim 10, wherein the thermal element comprises a resistor for heating the substrate responsive to the control signals.

18. The optical switching substrate according to claim 10, wherein the thermal element comprises a thermoelectric cooler for cooling the substrate.

19. The optical switching substrate according to claim 10, wherein the thermal element is a heating and cooling element.

20. An optical switch for selectively coupling optical signals on plurality of optical inputs to selected optical outputs, comprising:
    a switching substrate;
    a plurality of micro-mirrors formed on the substrate and tiltable relative to the substrate about first and second axes, wherein said micro-mirrors reflect the optical signals in optical paths between the optical inputs and optical outputs;
    a temperature sensor located on the substrate adjacent at least one of the micro-mirrors, wherein the temperature sensor senses the temperature near the at least one micro-mirror and generates a temperature signal indicative of the sensed temperature;

a thermal element located on the substrate adjacent the at least one micro-mirror and that adjusts the temperature near the at least one micro-mirror; and a temperature controller that receives the temperature signal and generates control signals for controlling the thermal element to adjust the temperature adjacent the micro-mirror until the temperature near the micro-mirror corresponds to a desired temperature.

21. The optical switch according to claim 20, wherein said temperature sensor is located on the micro-mirror.

22. The optical switch according to claim 20, wherein said temperature sensor is located on said substrate between at least two of the micro-mirrors.

23. The optical switch according to claim 20, wherein the thermal element is located between at least two of the micro-mirrors.

24. The optical switch according to claim 20, further comprising a plurality of thermal elements distributed over a surface of the substrate between the micro-mirrors.

25. The optical switch according to claim 20, further comprises a plurality of temperature sensors and a plurality of thermal elements, wherein at least one of the temperature sensors and at least one of the thermal elements is provided for each of the micro-mirrors.

26. The optical switch according to claim 20, further comprises a plurality of temperature sensors and a plurality of thermal elements, wherein at least one of the temperature sensors and at least one of the thermal elements is provided for a mirror group comprising a plurality of the micro-mirrors.

27. The optical switch according to claim 20, wherein the thermal element comprises a resistor for heating the substrate responsive to the control signals.

28. The optical switch according to claim 20, wherein the thermal element comprises a thermoelectric cooler for cooling the substrate.

29. The optical switch according to claim 20, wherein the thermal element is a heating and cooling element.

* * * * *